Patented Feb. 12, 1952

2,585,222

UNITED STATES PATENT OFFICE 2,585,222

VINYL RESIN PLASTICIZED WITH A MIXTURE OF A MONOHYDRIC ALCOHOL ESTER OF THE MALEIC ANHYDRIDE ADDUCT OF ROSIN ACID AND A MONOHYDRIC ALCOHOL ESTER OF A FATTY ACID

Paul F. Bruins, Douglaston, and Edward J. Kurtz, Brooklyn, N. Y., assignors to National Southern Products Corporation, a corporation of Delaware No Drawing. Application February 25, 1949, Serial No. 78,472

2 Claims. (Cl. 260—27)

1

This invention relates to plasticizers, particularly to plasticizers for the polyvinyl types of resins such, for example, as the polyvinyl chloride and its copolymers such as polyvinyl chloride-acetate and polyvinyl chloride-vinylidine chloride, and has for an object the provision of a plasticizer which shall be compatible with said resins in amounts sufficient to impart the desired processing properties thereto and which shall be economical of manufacture.

A further object of our invention is to provide a plasticizer for the polyvinyl chloride types of resins which shall be adapted to impart to said resins good processing properties, flexibility over a wide temperature range, high tensile strength, and the ability to withstand elevated temperatures for prolonged periods of time without undue loss of plasticizer by volatilization.

A still further object of our invention is the provision of an improved process for the production of a plasticizer of the character indicated from tall oil.

We have discovered that the monohydric alcohol esters of the maleic anhydride adduct of the rosin acids derived from southern pine are especially useful as plasticizers. They may be used alone but preferably are employed with other known plasticizers. As is well understood, the properties of plasticized compositions may be varied by blending different kinds of plasticizers and by varying the amounts of the plasticizers. We have found that mixtures of the esters of the maleic anhydride adduct of rosin acids and fatty acid esters are especially useful.

A convenient raw material for producing a mixture of the esters of the maleic anhydride adduct of rosin acids and esters of fatty acids is found in tall oil, which is a by-product of the soda or sulphate process of producing kraft paper from southern pine. This material is produced as a sodium soap on evaporating liquors which have been used to digest wood chips in making kraft paper. Upon acidification it is converted into crude tall oil.

Crude tall oil may be refined by distillation or by solvent refining to produce refined tall oil. While the material varies in composition due to differences in the wood from which it is derived, and in the method of refining treatment, a typical refined tall oil will be found to contain approximately the following:

| | Per cent |
|---|---|
| Fatty acids | 47.8 |
| Rosin acids | 45.4 |
| Sterols (unsaponifiables) | 6.6 |

2

Direct esterification of tall oil results in the formation of the fatty acid esters, but leaves the rosin acids unchanged. Attempted use of such a product as a plasticizer in vinyl halide compositions has proved it to be incompatible, even when it forms only a small proportion of the total plasticizer content. On the other hand, we have found that the compatibility of mixtures of fatty acid esters and esters of the maleic anhydride adduct of rosin acids obtained from tall oil increases as the percentage of maleic anhydride present increases, up to the theoretical amount required for reaction with all the rosin present in the tall oil.

The esters prepared in accordance with this invention may be represented by the following formulae:

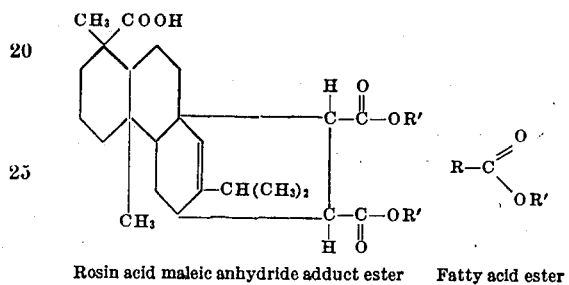

Rosin acid maleic anhydride adduct ester     Fatty acid ester in which $$R-C\diagup^O_O -$$

is a fatty acid radical, and R' is either a hydrocarbon or a heterocyclic radical containing from one to nine carbon atoms. The esters are made by reacting the mixture of rosin acid-maleic anhydride adduct and fatty acids which results from the adduct formation with an aliphatic, alicyclic, heterocyclic, or an aromatic alcohol until esterification is substantially complete.

The rosin acid-maleic anhydride adduct utilized in making the esters may be prepared by reacting the rosin acids present in the tall oil with a stoichiometric quantity of maleic anhydride at a temperature of 180° to 200° C. for a period of three hours. Under these conditions the desired reaction will proceed substantially to completion, and will leave the fatty acids present unchanged.

The following is an example of the preparation of our improved plasticizer from tall oil, employing isobutyl alcohol as the esterification agent:

| Materials | Pounds |
|---|---|
| Refined tall oil | 675 |
| Maleic anhydride | 98 |
| Isobutyl alcohol | 227 |
| Paratoluene sulphonic acid | 7.75 |
| Benzene (recovered) | 187 |
| Excess isobutyl alcohol (recovered) | 113 |

Yields—963 lbs. of ester

Procedure

The refined tall oil and maleic anhydride under $CO_2$ atmosphere are charged into an esterification kettle, including a reflux condenser and a decanter as a part of the apparatus, and are held at 180° C. for two hours. The adduct formation is more than 99% complete at this time and temperature.

The charge is cooled to 110° C. and the alcohol, benzene and sulphonic acid added. Heating to maintain reflux is then begun, and the water of esterification removed by means of a decanter below the reflux condenser, thus returning the benzene to the system. Refluxing is continued until water nearly ceases to be removed. Esterification is 90% complete in 2 hours, and 95+% in 4 hours, yielding a product with a final acid number (solvent removed) of 50–55.

Benzene and excess alcohol are next distilled off at atmospheric pressure, until the rate falls, then under gradually reduced pressure to a final condition of 15 mm. and 180° C., with agitation. When stripping is complete, the ester is cooled to 100° C. or less, before exposing to air. Mild agitation is used for both adduct formation, esterification and stripping.

Similar procedures, using chemical equivalents of other alcohols may be used. For methyl and ethyl alcohol, or secondary alcohols, longer times or special procedures are necessary due to lower refluxing temperature or a slower reaction rate, or both.

The vinyl plastics which may be plasticized with the products of this invention are the various forms of polyvinyl chloride, copolymers of vinyl chloride and vinyl acetate or vinylidene chloride, particularly such copolymers made by copolymerizing predominating amounts of vinyl chloride with smaller amounts of vinyl acetate or vinylidene chloride.

Preferably, from 16 to 24 parts by weight of our improved plasticizer are utilized with from 16 to 24 parts of a standard commercial plasticizer; e. g. di-octyl-phthalate, and for each 60 parts of vinyl resin. Fillers, pigments, and stabilizers may also be utilized, as in conventional practice.

The following are typical examples of plastic compositions which we have made employing plasticizers produced in accordance with our invention, and others employing a well known commercial plasticizer alone:

| Materials | Examples, parts by weight | | | | | | | |
|---|---|---|---|---|---|---|---|---|
|  | I | II | III | IV | V | VI | VII | VIII |
| Copolymer 95% vinyl chloride, 5% vinyl acetate | 60 | 60 | 60 | 60 | 60 | 60 | 66.5 | 72 |
| Dioctyl phthalate | 20 | 20 | 16 | 20 | 20 | 24 | 28 | 23 |
| Tetrahydrofurfuryl alcohol Ester refined tall oil | 20 |  |  |  |  |  |  |  |
| Isobutyl Ester, refined tall oil |  |  |  |  | 20 | 16 |  |  |
| n-Butyl Ester, refined tall oil |  |  | 24 | 20 |  |  |  |  |
| Dibasic lead stearate | 1 | 1 | 1 | 1 | 1 | 1 | 1 | 1 |

The resin employed in the above examples, as indicated, was a copolymer of 95% vinyl chloride and 5% vinyl acetate. The various esters were prepared by reacting samples of a refined tall oil with stoichiometric quantities of maleic anhydride (calculated on rosin acids present) and esterifying the resulting mixture with the desired monohydric alcohol, as already described. Dibasic lead stearate was employed as a stabilizer. The ingredients were mixed and the mixtures were milled for approximately five minutes on a rubber mill at a roll temperature of 270–280° F. and the resulting compositions were molded in sheet form under heat and pressure. The sheets were molded for 13 minutes at a temperature of 302° F. under a pressure of 1000 lbs./in.² The molded compositions were subjected to tensile, aging, hardness, fading, and weight loss tests. Results of these tests showed that the compositions possessed excellent physical properties.

The results of physical tests on the before mentioned compositions are tabulated below:

| Physical Properties | Examples— | | | | | | | |
|---|---|---|---|---|---|---|---|---|
|  | I | II | III | IV | V | VI | VII | VIII |
| Tensile strength, p. s. i. Aged 30 days at 70° F. | 2,780 | 2,240 | 2,000 | 2,030 | 2,470 | 2,640 | 3,290 | 2,900 |
| Stress at 100% elongation, lbs. Aged 30 days at 70° F. | 1,630 | 1,820 | 1,410 | 1,330 | 1,520 | 1,450 | 2,510 | 1,690 |
| Elongation, per cent at breaking point Aged 30 days at 70° F. | 245 | 200 | 215 | 225 | 260 | 320 | 220 | 265 |
| Shore hardness, 5 sec. | 76 | 80 | 86 | 85 | 86 | 81 | 95 | 82 |
| Wt. loss after being exposed 7 hrs. at 300° F (percent of total plasticizer) | 8.13 | 7.05 | 10.36 |  | 6 |  | 9.65 |  |

The tensile strengths and elongations given above were determined by A. S. T. M. Test D412–4.

All compositions were found stable to light by exposure under a fadometer for 7 hours.

Thus it will be seen the plasticization of polyvinyl halide compositions by tall oil-maleic anhydride adduct esters imparts to the compositions excellent light stability and tensile properties. Furthermore, the compositions are subject to only slight loss of plasticizers by volatilization when subjected to elevated temperatures for prolonged periods of time. The plasticizers impart desirable processing properties to vinyl resins and are compatible with the resins in relatively large amounts.

It can be seen from the foregoing examples that it requires a greater amount of plasticizer to give similar physical properties where our improved plasticizer is employed as a partial replacement of a primary plasticizer such as dioctyl phthalate. This is an advantage, rather than a disadvantage, since our plasticizer is much less expensive to produce than plasticizers heretofore produced and is less expensive than the resin with which it is compounded. We thus provide a greater mass of plastic composition at a lower unit price without any sacrifice of useful properties.

In order to form the esters of the maleic anhydride adduct of rosin acids, without the presence of fatty acid esters, we may start with wood rosin, which is recovered from pine stumps, or gum rosin, which, as is well known, is a by-product of turpentine distillation.

The maleic anhydride adduct of rosin may be prepared as follows:

Heat together 115.5 grams of rosin and 36.2 grams of maleic anhydride for two hours at 180° C. by which time the reaction will be complete.

The resulting product may be esterified by reacting with 82.5 grams of normal butyl alcohol, employing 1.5 grams paratoluene sulfonic acid as a catalyst and 40 grams of benzene as an entrainer to remove water. The mixture is refluxed for 5 hours at a temperature of 101°–107° C. until no more water of esterification is evolved and esterification is found to be complete. The excess benzene and butyl alcohol are then distilled off, using methods previously described for removing the last traces.

Still another starting material which may be employed is the methyl ester of rosin which is now manufactured and sold commercially. This material also may be reacted with maleic anhydride to form the maleic anhydride adduct of rosin acid and the adduct esterified, in a manner similar to that described above where the starting material is rosin.

As hereinbefore stated, we may employ as the esterifying agent a monohydric alcohol having from one to nine carbon atoms. For economic reasons and also for the most dependable results we preferably employ as the esterifying agent propyl, butyl, or isobutyl alcohol. Tetrahydrofurfuryl alcohol, also, is entirely satisfactory, but is more expensive.

While we have described more than one embodiment of our invention, it will be apparent to those skilled in the art that it is not so limited, but that it is susceptible of various other changes and modifications without departing from the spirit thereof, and we desire, therefore, that only such limitations shall be placed thereupon as are specifically set forth in the appended claims.

What we claim is:

1. A plastic composition comprising approximately 60 parts by weight a vinyl plastic selected from the group consisting of polyvinyl chloride, a copolymer of vinyl chloride with vinyl acetate and a copolymer of vinyl chloride with vinylidene chloride, from 16 to 24 parts by weight dioctyl phthalate, and from 16 to 24 parts by weight a plasticizer comprising a mixture of a monohydric aliphatic alcohol ester of the maleic anhydride adduct of rosin acid found in tall oil and a monohydric aliphatic alcohol ester of the fatty acids resulting from forming said adduct, said monohydric aliphatic alcohol containing less than ten carbon atoms.

2. A plastic composition as defined in claim 1 in which the monohydric aliphatic alcohol employed is selected from the group consisting of butyl alcohol, isobutyl alcohol, propyl alcohol and tetrahydrofurfuryl alcohol.

PAUL F. BRUINS.
EDWARD J. KURTZ.

REFERENCES CITED

The following references are of record in the file of this patent:

UNITED STATES PATENTS

| Number | Name | Date |
| --- | --- | --- |
| 2,039,243 | Krzikalla et al. | Apr. 28, 1936 |
| 2,228,365 | Reppe et al. | Jan. 14, 1941 |
| 2,356,562 | Berg et al. | Aug. 22, 1944 |
| 2,409,930 | Cox | Oct. 22, 1946 |
| 2,465,888 | Lawrence | Mar. 29, 1949 |
| 2,467,126 | Graff | Apr. 12, 1949 |